(12) United States Patent
Gabriel

(10) Patent No.: US 6,724,100 B1
(45) Date of Patent: Apr. 20, 2004

(54) HEV CHARGER/GENERATOR UNIT

(75) Inventor: David Gabriel, New Baltimore, MI (US)

(73) Assignee: Ford Motor Company, Dearborn, MI (US)

( * ) Notice: Subject to any disclaimer, the term of this patent is extended or adjusted under 35 U.S.C. 154(b) by 55 days.

(21) Appl. No.: 09/659,018

(22) Filed: Sep. 8, 2000

(51) Int. Cl.[7] .................................................. B60L 1/00
(52) U.S. Cl. ...................... 307/9.1; 180/65.1; 180/65.2; 180/65.3
(58) Field of Search ........................... 307/9.1; 180/65.1, 180/65.2, 65.3

(56) References Cited

U.S. PATENT DOCUMENTS

| | | | | |
|---|---|---|---|---|
| 3,655,991 A | * | 4/1972 | Schneider | ................. 307/10 R |
| 3,790,808 A | | 2/1974 | Sagal | |
| 3,824,404 A | | 7/1974 | Ghere | |
| 3,953,740 A | | 4/1976 | Seiter | |
| 4,074,145 A | | 2/1978 | Hafoon | |
| 4,159,515 A | | 6/1979 | Walkowiak | |
| 4,182,960 A | * | 1/1980 | Reuyl | .................... 237/12.3 R |
| 5,066,866 A | | 11/1991 | Hallidy | |
| 5,343,970 A | | 9/1994 | Severinsky | |
| 5,642,270 A | * | 6/1997 | Green et al. | ................... 363/12 |
| 5,861,800 A | * | 1/1999 | Peters et al. | ................ 340/456 |
| 5,865,258 A | * | 2/1999 | McGrew, II | ................ 172/22 |
| 6,232,961 B1 | * | 5/2001 | Kunimatsu et al. | ......... 345/173 |

* cited by examiner

*Primary Examiner*—Robert DeBeradinis
(74) *Attorney, Agent, or Firm*—Carlos L. Hanza

(57) ABSTRACT

The present invention provides an apparatus, system, and method of utilizing a Home Power Unit ("HPU") which functions as a battery charger for a Hybrid Electric Vehicle ("HEV") or as a generator, utilizing the HEV's electrical power to operate external electrical devices. In its simplest form, the HPU comprises a Transformer, inverter means, rectifier means, a control unit, connection means to the HEV and external electrical loads or sources and switching means to change operation between charger and generator function. Alternative embodiments of the present invention utilize the HEV's existing components thereby avoiding component redundancy within the HPU. Specifically, in the first alternative embodiment, the inverter means are utilized within the vehicle, therefore, requiring only filter and transformer to be added to the vehicle. In the second alternative embodiment, the vehicle's DC-to-DC Converter is utilized as opposed to implementing a transformer. Therefore, only an inverter and filter are added to the system.

22 Claims, 3 Drawing Sheets

HEV CHARGER/GENERATOR UNIT

BACKGROUND OF THE INVENTION

1. Field of Invention

The present invention relates to a Home Power Unit for Hybrid Electric Vehicles ("HEVs") that acts as a general charger for the vehicle's battery and as a generator to operate external electrical devices, such as power tools.

2. Discussion of the Prior Art

The need to reduce fossil fuel consumption and pollutants of automobiles and other vehicles powered by Internal Combustion Engines ("ICEs") is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called Hybrid Electric Vehicles ("HEVs"). See generally, U.S. Pat. No. 5,343,970 (Severinsky).

The HEV has been described in a variety of configurations. Many HEV patents disclose systems where an operator is required to select between electric and internal combustion operation. In other, the electric motor drives one set of wheels and the ICE drives a different set.

Other configurations have developed. A Series Hybrid Electric Vehicle ("SHEV") is a vehicle with an engine (most typically an ICE) which powers a generator. The generator, in turn, provides electricity for a battery and motor coupled to the drive wheels of the vehicle. There is no mechanical connection between the engine and the drive wheels. A Parallel Hybrid Electrical Vehicle ("PHEV") is a vehicle with an engine (most typically an ICE), battery, and electric motor combined to provide torque to power the wheels of the vehicle.

A Parallel/Series Hybrid Electric Vehicle ("PSHEV") has characteristics of both a PHEV and a SHEV. The PSHEV is also known as a torque (or power) splitting powertrain configuration. Here, the torque output of the engine is given in part to the drive wheels and in part to an electrical generator. The electric generator powers a battery and motor that also provide torque output. In this configuration, torque output can come from either source or both simultaneously. In this configuration the vehicle braking system can even deliver torque to drive the generator to produce charge to the battery.

As the HEV continues to develop, new challenges are encountered and new uses are developed. One of the main challenges associated with all HEVs is insuring enough battery charge to start and operate the vehicle. All batteries lose charge as a result of use or lapse of time. Generally, the HEV battery is charged by an ICE Generator in the vehicle; however, during unusual conditions or emergencies, external battery charging may be necessary.

A potential use for the HEV is to utilize its battery and generator as a source of electrical power to operate electrical devices such as power tools. This type of vehicle use for auxiliary electrical power is well known for conventional ICE vehicles. Specifically, many patents have been issued utilizing the components of ICEs as a power source for electrical devices. For example, U.S. Pat. No. 3,824,404 (Leonard Ghere); U.S. Pat. No. 3,953,740 (Charles Seiter, Jr.); U.S. Pat. No. 4,074,145 (P. Laffoon, et al.); and U.S. Pat. No. 5,066,866 (William Hallidy), disclose various methods of utilizing a vehicle's alternator to generate AC voltage to power electrical devices. However, these patents do not apply to HEVs because the HEV does not require an alternator. The HEV already has a ready source of electrical power within its battery and can generate additional power with an onboard generator. However, the HEV's electrical power, needs to be converted for external use by electrical devices.

It is beneficial, economical, and efficient to have an apparatus, system and method that incorporates an HEV charging system with the ability to harness the vehicle's electrical power system for auxiliary electrical applications.

SUMMARY OF THE INVENTION

The present provides a method, system, and apparatus for charging an HEV battery and utilizing the HEV as a generator to operate external electrical devices. The apparatus is called a Home Power Unit ("HPU") and combines these two functions into one apparatus or system. This provides efficient and easy use of the invention.

The HPU, as a charger, provides the user with the ability to charge the HEV's battery during emergency or unusual conditions. Generally, the battery is charged through the operation of an onboard generator in combination with the engine. If the onboard high voltage battery charge depletes completely, the engine would not be able to start. Therefore, it is necessary to have a way to charge a HEV battery. The present invention provides just such a means.

The HPU also operates as a generator allowing a user to draw upon the vehicle's electrical power to run external electrical devices. The HPU draws power from the HEV's generator and to some extent, its battery. The HPU converts this power to a useable form for external electrical devices such as power tools.

In both modes, the HPU functions as a conversion device to convert external AC electrical power sources to DC power for charging the REV battery (charger function) or convert on board DC electric power to AC electric power (generator function). In both modes the HPU is also capable of converting from one desired voltage to another (i.e., from low 110 to high 300 or reverse). In its simplest form, a HPU apparatus comprises a Transformer to convert electrical voltages, inverter means to convert DC to AC, rectifier means to convert AC to DC, a control unit, a connection means to the HEV and external electrical loads or sources, and a switching means to change operation between the charger and the generator functions. The apparatus typically connects to external loads or services through connection means with the Transformer. The HPU then connects to the HEV's High Voltage DC Bus and system controllers, specifically, the Battery Electronic Control Unit. The switching devices for the HPU may comprise a momentary two position switch on the instrumental panel, a menu selection from an on-screen display mounted in the instrumental panel or a two position switch mounted on the HPU.

In an alternative embodiment, the HPU is incorporated directly into the components of the HEV. In this manner, redundant components are avoided. Particularly, in the first alternative embodiment, the HPU inverter means are already within the vehicle, specifically a traction inverter. A contactor is implemented between the traction inverter and the motor to switch the power source from the vehicle function (going to the motor) to the HPU function (operating as a generator and proceeding to the filter).

In another alternative embodiment, HEV components are again implemented as opposed to installing a separate HPU unit to avoid redundancy. In this second alternative embodiment, the DC-to-DC Converter is utilized as opposed to the Transformer. The inverter/rectifier means are then implemented after the DC-to-DC Converter to provide the appropriate current changes.

DETAILED DESCRIPTIONS OF THE PREFERRED EMBODIMENTS

The present invention provides a unified apparatus, system and for emergency charging of the vehicle's battery and utilizing the power storage and generating capabilities of the vehicle to run external electrical devices. The present invention combines charger functions, with the ability to use the vehicle's generator and battery, to some limited extent, to operate external electrical devices. The present invention is referred to as a Home Power Unit ("HPU"). In its simplest form, the HPU is a separate component that performs the electrical conversions from AC-to-DC or DC-to-AC and from one voltage to another (ex., 110 volt to 300 volt or 300 volt to 110 volt).

Figure 1:
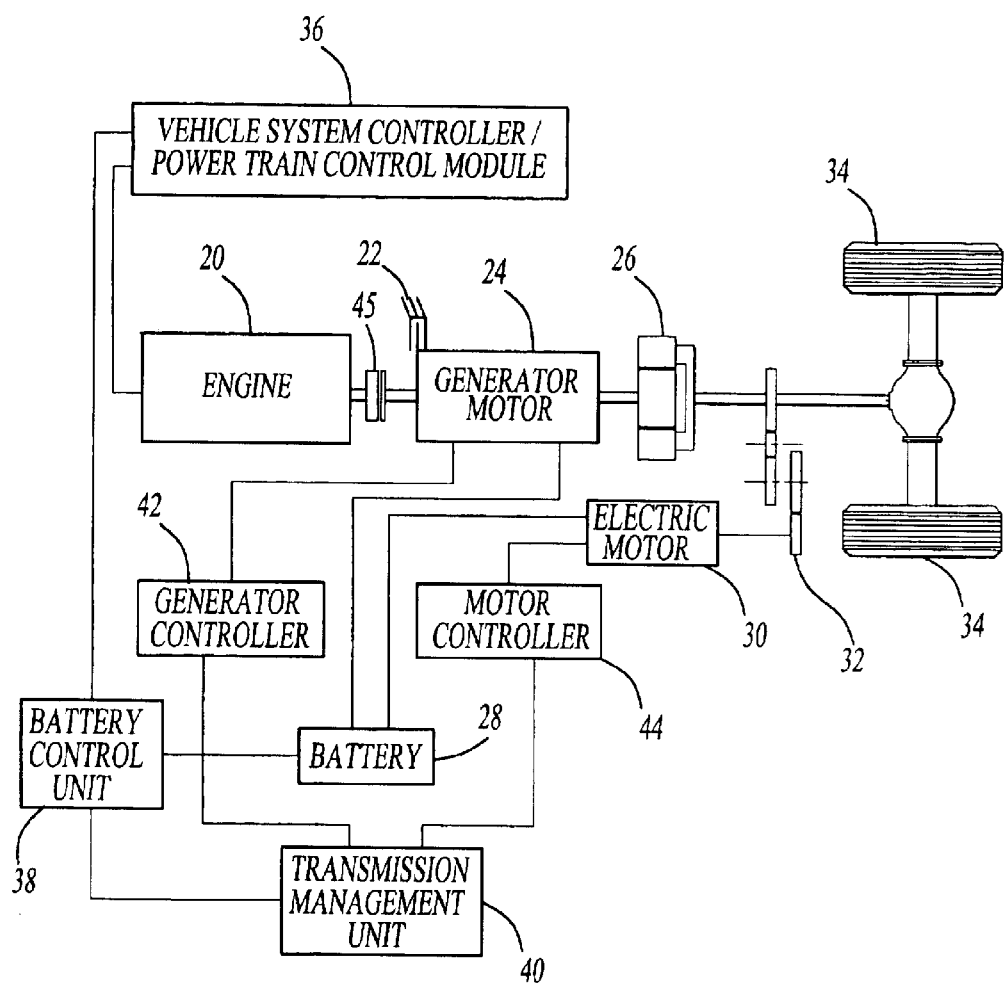
FIG. 1 illustrates the general layout of a Hybrid Electric Vehicle.

FIG. 1 demonstrates one configuration for a Parallel/Series Hybrid Electric Vehicle ("torque splitting") configuration. The basic makeup of the vehicle includes: An Engine 20 connected to a Planetary Gear 26 through a one way Clutch 36. The Planetary Gear 26, splits the Engine 20 output energy into a series path, from the Engine 20 to a Generator Motor 24, and a parallel path, from the Engine 20 to driving Wheels 34. The engine speed can be controlled by varying the split to the series path, while maintaining the mechanical connection through the parallel path. The Generator Motor 24 is connected to a Generator Brake 45. The Generator Motor 24 is connected to the Battery 28, and is capable of charging the Battery 28. The Electric Motor 30, augments the engine on the parallel path through a Second Gear Set 32. The motor also provides the opportunity to use energy directly from the series path, essentially drawing from the power created by the Generator Motor 24, thereby reducing the losses associated with converting energy into and out of chemical energy in the battery 28.

Many components in this configuration are controlled by Vehicle System Controller ("VSC") 36. The VSC 36, operate all the vehicle's main components by connecting to each components' controllers. The VSC 36 also contains the Powertrain Control Module ("PCM"). These two "separate" controllers are housed in the same unit. The VSC/PCM 36 is then connected to the Engine 20. The VSC 36 is also connected to a Battery Control Unit ("BCU") 38, and a Transmission Management Unit ("TMU") 40 through a Communication Network. The BCU 38 is then connected to the Battery 28. The TMU 40 is connected to a Generator Controller 42 and a Motor Controller 44. The Generator Controller 42 is then connected to the Generator Motor 24 and the Motor Controller 44 is connected to the Motor 30.

Figure 2:
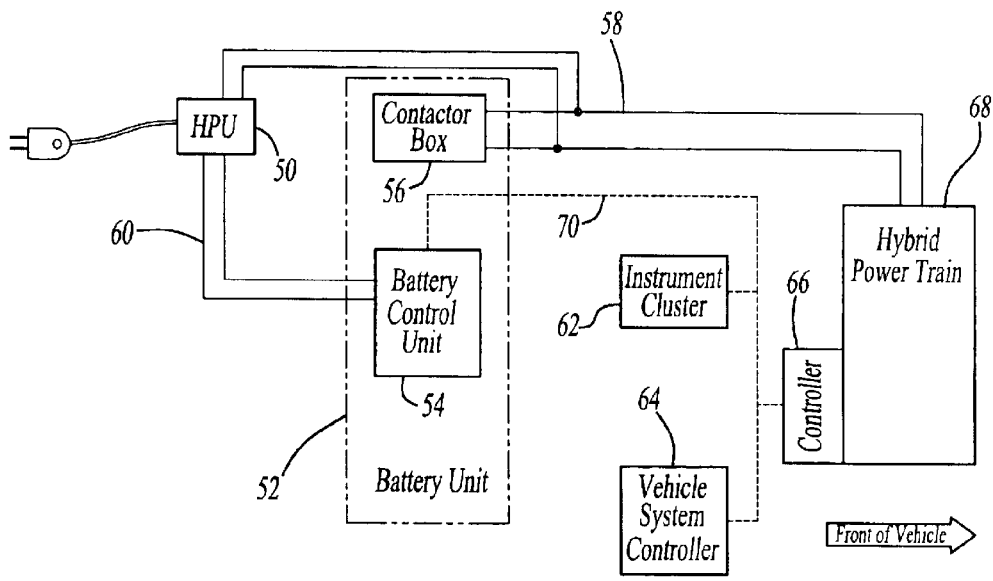
FIG. 2 illustrates the Home Power Unit's implementation into a Hybrid Electrical Vehicle.

FIG. 2 demonstrates the general configuration of an HEV utilizing the HPU. An HPU 50, is connected to a vehicle's high voltage DC Bus 58, and to a vehicle's Battery Control Unit 54 ("BCU") through Control Circuits 60. The BCU 54 is then connected to a Communication Network 70 which is linked to an Instrumental Cluster 62, a Transaxle Controller 66 and a Vehicle System Controller 64. The Battery Unit 52 includes the batteries, the BECU 54 and a Contactor Box 56, which connects the battery to the high voltage DC Bus 58.

Figure 3:
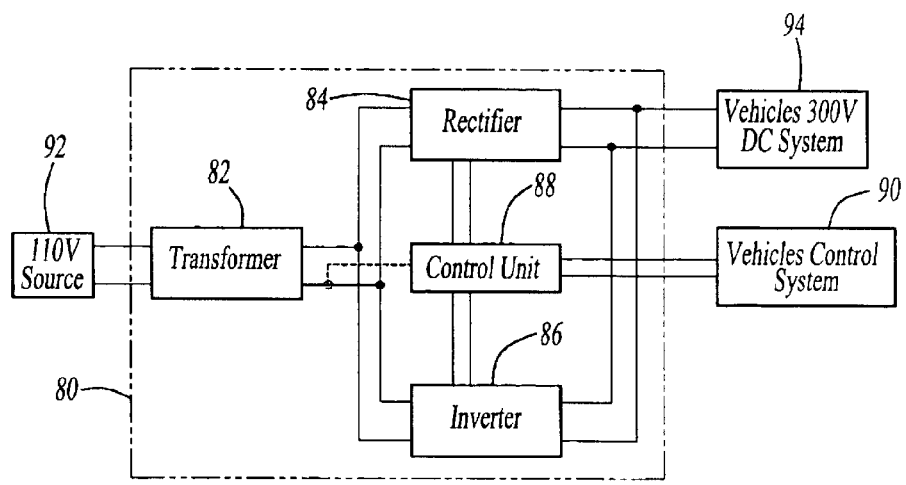
FIG. 3 demonstrates the layout of the Home Power Unit.

FIG. 3 demonstrates the internal components of the HPU. An HPU 80 includes a Transformer 82 that is connected to a Rectifier 84 and an Inverter 86. The HPU 80 is operated by an Internal Control Unit 88, which is connected to the Rectifier 84 and the Inverter 86. The Internal Control Unit 88 also connects to a vehicle's control system 90, specifically the Battery Control Unit. The Transformer 82 connects to an external source/load 92, (typically a power outlet or an electric power device). Finally, lines to/from the Rectifier 84 and the Inverter 86 are connected within the HPU 80 and then connected to a vehicle's high voltage DC Bus 94.

The HPU 80 operates as a two-way conduit in which the vehicle is placed into charging mode or generator mode by the user. The use of the HPU 80 would be dependent upon sufficient safety measures within the vehicle control systems. For example, the HPU 80 can require the vehicle's gear selector to be in park, the doors shut, and the parking brake to be applied before activating. Further, activation of the HPU 80 is communicated to all control modules on the Communication Network 70 to prohibit vehicle movement during HPU operation.

The HPU 80 can be activated through a variety of means including a momentary two position switch mounted a instrument panel, a menu selection from an on-screen display mounted on the instrument panel, or a two position switch mounted on the HPU itself. HPU 80 activation and switch position (which dictates HPU use as either charger or generator), is relayed to the battery electric control unit (Vehicle Control System 90) through the HPU's control unit 88.

Referring again to FIG. 3, the HPU, as previously described, can operate in two modes. In the first mode, the HPU operates as a charger. In this case, the HPU 80 is connected to an external source 92 (e.g., 110 volt AC) which is run into the Transformer 82. The transformer 82 converts the source into the desire AC voltage, if necessary (e.g., 110 volt AC to 300 volt AC). The Transformer 82 then sends the AC source to the Rectifier 84 where it is converted to DC source (300 volt DC). The Rectifier 84 then sends the DC source to the vehicle's High Voltage DC Bus 94 to charge the HEV's battery.

In generator mode, the HPU 80 utilizes the vehicle's high voltage DC power source to produce useable A/C voltage. Specifically, the HPU 80.would be connected to the vehicle's High Voltage DC System 94. In providing a DC source, the HEV draws upon the generator from the hybrid powertrain or, to, some limited extent, and the vehicle's battery. The high voltage DC source (300 volt DC) would go through the HPU Inverter 86 where the DC source is converted to an AC source (300 volt DC to 300 volt AC). The AC source continues to the Transformer 82 where the source is converted from high voltage AC to a desirable, usable AC voltage (300 to 110 volt). Upon finishing this step, the HPU 80 connects to any external electrical device requiring the available (110 volt) AC source.

Alternative Embodiment #1

In an alternative embodiment, the HPU utilizes vehicle to avoid component redundancy. Specifically, this embodiment provides a means for using the HEV as a "generator" without adding a separate HPU unit to the vehicle.

Figure 4:
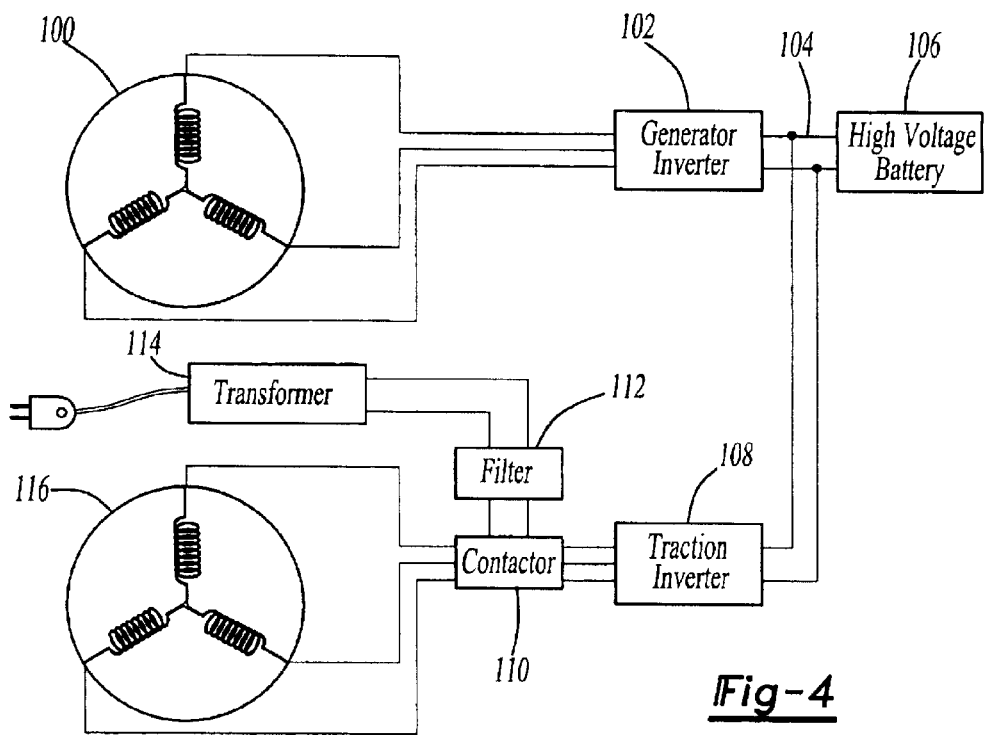
FIG. 4 illustrates alternative embodiment of the HPU utilizing some of the Hybrid Electric Vehicle's existing components.

FIG. 4 illustrates this embodiment. A Generator 100 is connected to an engine (typically in ICE) to generate electrical power. The Generator 100 is connected to a Generator Inverter 102 which converts the AC source to DC. Both the Generator Inverter 102 and a High Voltage Battery 106 are connected to a DC Bus 104. The DC Bus 104 is also connected to a Traction Inverter 108. In a normal HEV, the Traction Inverter 108 then connects to a Traction Motor 116; however, the present invention, in an attempt to utilize the components previously described would add a Contactor 110 between the Traction Motor 116 and the Traction Inverter 108. The Contactor 110 would then be connected to a Filter 112 which is connected to a Transformer 114. The Transformer 114 could then connect to external loads.

The operation of this embodiment is similar to that previously described. In this case the Traction Inverter 108, which is already part of the HEV, is utilized in place of adding a separate inverter within a HPU. However the Traction Inverter 108 will require a unique operating strategy to operate with the HPU. The Traction Inverter 108 coverts the high voltage DC source to AC (300 volt DC to 300 volt AC). This is normally done to run the Traction Motor 116. The Contactor 110 operates as a switch, directing the high voltage AC source to the Traction Motor 116 or the additional "HPU" components. Specifically, if the generator function of the HPU is selected, the Contactor 110 directs the high voltage AC source to the Filter 112, where noise is removed. The high voltage AC source is then sent to the Transformer 114 which converts the AC source to AC voltage useable by external electrical devices (300 volt AC to 110 volt AC).

Alternative Embodiment #2

Figure 5:
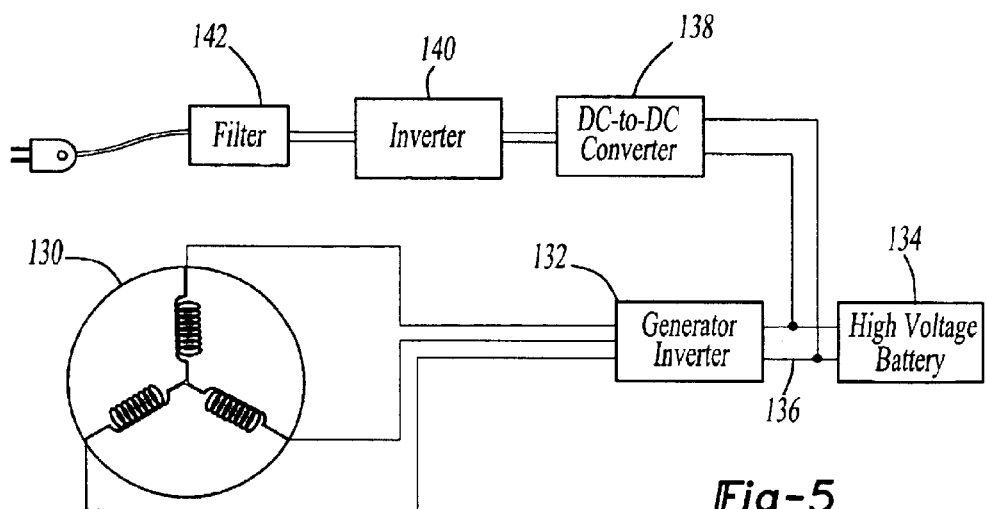
FIG. 5 illustrates alternative embodiment of the HPU utilizing some of the Hybrid Electric Vehicle's existing components.

In a second alternative embodiment, different HEV components are used to achieve the same HPU results. FIG. 5 illustrates the second embodiment.

A Generator 130 is attached to the engine to help generate electrical power. The Generator 130 output is feed to a Generator Inverter 132 where the electrical power is converted to DC. The Generator Inverter 132 and a High Voltage Battery 134 are connected to a high voltage DC Bus 136. The DC Bus 136 is then connected to a DC-to-DC Converter 138. The DC-to-DC Converter 138 converts the high voltage DC source to a low voltage DC source (300 volt DC to 110 volt DC). The DC-to-DC Converter 138 is then connected to an Inverter 140 to convert the DC source to AC (110 volt DC to 110 volt AC). The Inverter 140 is then connected to a Filter 142 to remove any signal noise. Finally the Filter 142 can connect to any external electric device.

In this second embodiment, power is drawn through the dedicated DC-to-DC Converter 138 and Inverter 140 only when the ICE is being used to turn the Generator 130 to generate electricity. This minimizes cycling the high voltage battery. It should also be noted that the DC-to-DC Converter 138 and Inverter are cooled to allow them to handle large AC electrical loads.

With this second embodiment, the unit may also operate as a charger. DC-to-DC converter technology is advancing and new two-way converters exist. If a two way DC-to-DC converter is applied, and a Rectifier is added to the Inverter 140, the unit could be used to charge the HEV's High Voltage Battery 134. Specifically, the Filter 134 would be connected to a external AC source. This source would then pass through a Rectifier, which would be located where the Inverter 140 is and converts the AC source to a DC source. The Rectifier connects to the DC-to-DC converter 138 to convert the low voltage DC source to high voltage DC source. The DC-to-DC Converter 138 attaches to the high voltage DC Bus 136 which is attached to the High Voltage Battery 134.

What is claimed is:

1. A motor vehicle electrical power system for powering an electrical load external to the vehicle, comprising:

an internal combustion engine;

a battery;

an electric generator coupled to said internal combustion engine for generating AC electrical power when said internal combustion engine is running;

a generator inverter disposed between said electric generator and said battery for converting the AC electrical power generated by said electric generator to DC electrical power for storage in said battery;

an electric traction motor coupled to said battery;

a traction inverter coupled to said battery for converting the stored DC electrical power to an AC power input for said electric traction motor;

a switching device disposed between said traction inverter and said electric traction motor for selectively diverting the AC electrical power input for application to the external electrical load;

means for powering the external electrical load only if a safety condition is satisfied; and means for prohibiting movement of the vehicle when powering the external electrical load.

2. The system according to claim 1, wherein said switching device comprises a contactor.

3. The system according to claim 1, further comprising:

a filter coupled to said switching device for minimizing noise in the diverted AC power input; and a transformer coupled between said filter and the external electrical load.

4. The system according to claim 1, further comprising:

a DC-to-DC converter coupled between said first electric machine and said first inverter for generating lower voltage DC electrical power from the DC electrical power produced by said first inverter;

an inverter coupled to said DC-to-DC inverter for converting the lower voltage DC electrical power to an AC power output for application to the external electrical load.

5. The system according to claim 4, further comprising a second filter for minimizing noise in the AC power output.

6. The system according to claim 4, wherein:

said DC-to-DC converter is a two-way DC-to-DC converter;

said inverter comprises a rectifier, and said system is operable in a charger mode.

7. The system according to claim 6, further comprising means for selecting operation of said system in a generator mode versus the charger mode.

8. The system according to claim 1, wherein said control means inhibits operation of said system based on one or more of a gear selector position, door open/shut condition and parking brake condition.

9. A motor vehicle electrical power generating system for powering an electrical load external to the vehicle, comprising:

an internal combustion engine;

a battery;

an electric generator coupled to said internal combustion engine for generating AC electrical power when said internal combustion engine is running;

a generator inverter disposed between said electric generator and said battery for converting the AC electrical power generated by said electric generator to DC electrical power;

a DC-to-DC converter coupled between said electric generator and said generator inverter for generating lower voltage DC electrical power from the DC electrical power produced by said generator inverter;

an inverter coupled to said DC-to-DC converter for converting the lower voltage DC electrical power to an AC power output to power the external electrical load;

means for powering the external electrical load only if a safety condition is satisfied; and means for prohibiting movement of the vehicle when powering the external electrical load.

10. The system according to claim 9, further comprising a second filter for minimizing noise in the AC power output.

11. The system according to claim 9, wherein:

said DC-to-DC converter is a two-way DC-to-DC converter;

said inverter comprises a rectifier; and said system is operable in a charger mode.

12. The system according to claim 11, further comprising means for selecting operation of said system in a generator mode versus the charger mode.

13. The system according to claim 9, wherein said control means inhibits operation of said system based on one or more of a gear selector position, door open/shut condition and parking brake condition.

14. A method for operating a hybrid electric vehicle having a battery, inverter and at least one electric motor, the method comprising:

applying DC electrical power stored in the battery to the inverter to generate AC electrical power for the motor;

diverting the AC electrical power to an external load so as to operate the vehicle in a generator mode;

operating the vehicle in the generator mode only if a safety condition is satisfied; and prohibiting movement of the vehicle when operating the vehicle in the generator mode.

15. The method according to claim 14, wherein said operating step comprises the step of inhibiting generator mode operation based on a gear selector position of the vehicle.

16. The method according to claim 14, wherein said operating step comprises the step of inhibiting generator mode operation based on a door open/shut condition of the vehicle.

17. The method according to claim 14, wherein said operating step comprises the step of inhibiting generator mode operation based on a parking brake condition of the vehicle.

18. A method for operating a hybrid electric vehicle having a battery, DC-to-DC converter, at least one electric generator coupled to an internal combustion engine, and a generator inverter the method comprising:

operating the internal combustion engine to generate AC electrical power from the generator;

applying the generated AC electrical power to the generator inverter in order to generate DC electrical power;

applying the DC electrical power to the DC-to-DC converter to generate a lower voltage DC electrical power;

inverting the lower voltage DC electrical power to a generate an AC power output for an external load, thereby operating the vehicle in a generator mode;

operating the vehicle in the generator mode only if a safety condition is satisfied; and prohibiting movement of the vehicle when operating the vehicle in the generator mode.

19. The method according to claim 18, wherein said operating step comprises the step of inhibiting generator mode operation based on a gear selector position of the vehicle.

20. The method according to claim 18, wherein said operating step comprises the step of inhibiting generator mode operation based on a door open/shut condition of the vehicle.

21. The method according to claim 18, wherein said operating step comprises the step of inhibiting generator mode operation based on a parking brake condition of the vehicle.

22. The method according to claim 18, wherein the DC-to-DC converter is bidirectional and wherein the method further comprises the step of operating the vehicle in a charging mode.

* * * * *